Sept. 12, 1961
A. SCHEUNERT
2,999,901
CONNECTOR FOR EXTENDING TELEPHONE CALLS TO LINES WITH DIFFERENT SERVICE REQUIREMENTS
Filed June 21, 1956
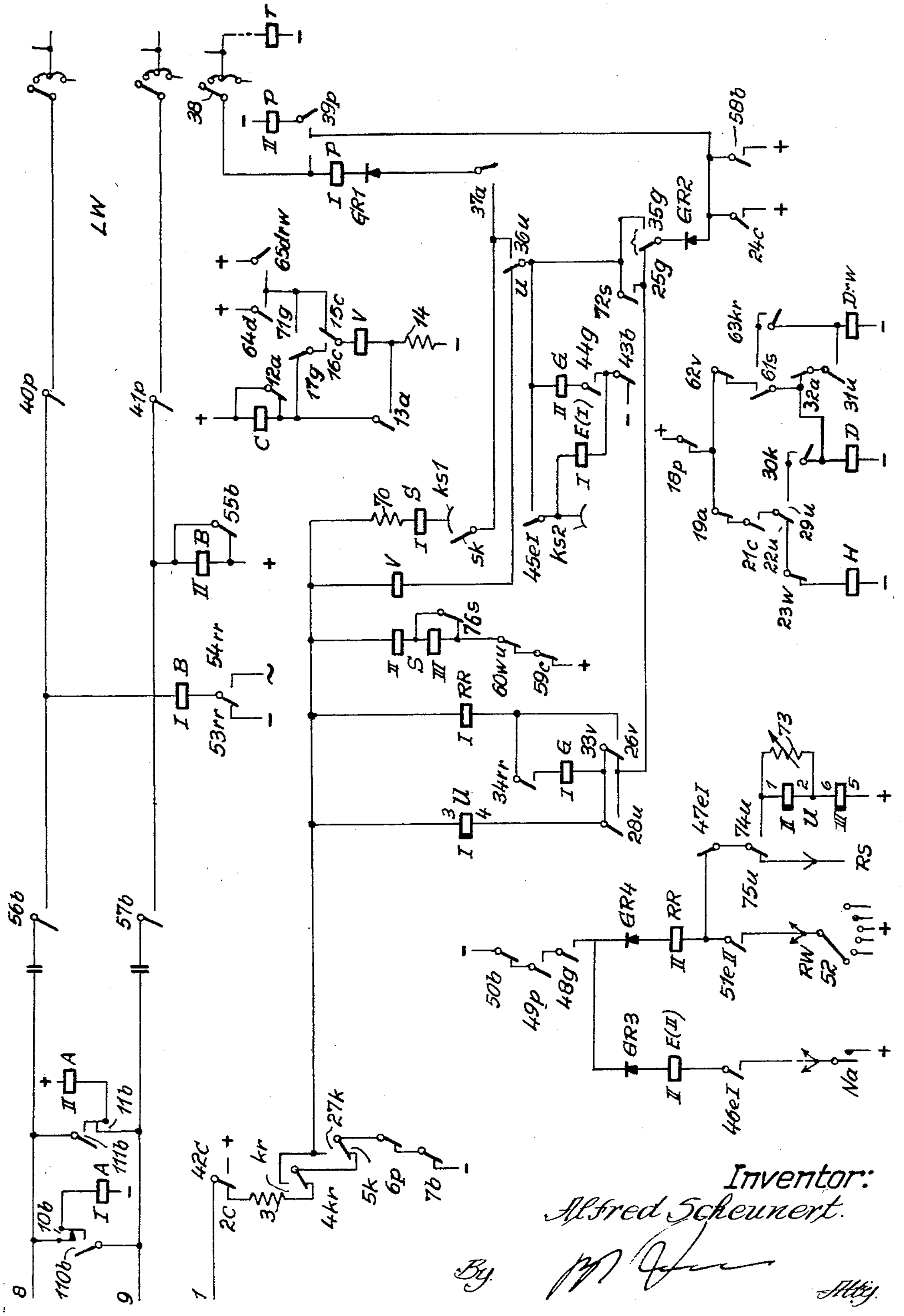
Inventor:
Alfred Scheunert
By
Atty.

United States Patent Office 2,999,901
Patented Sept. 12, 1961

2,999,901

CONNECTOR FOR EXTENDING TELEPHONE CALLS TO LINES WITH DIFFERENT SERVICE REQUIREMENTS

Alfred Scheunert, Berlin-Siemensstadt, Germany, assignor to Siemens & Halske Aktiengesellschaft Berlin and Munich, a corporation of Germany Filed June 21, 1956, Ser. No. 592,788
Claims priority, application Germany June 30, 1955
4 Claims. (Cl. 179—17)

This invention relates to telephone systems and is particularly concerned with a circuit arrangement for connectors having access to individual lines and to private branch exchange trunk groups and also to party lines.

After connection with a party line has been established, the ringing current for the desired party line station can be connected only if there is assurance that the full corresponding ringing code will be transmitted. This requirement must be fulfilled because a fractional code, for example, 1 time short and 1 time long instead of 3 times short and 1 time long, may represent the full ringing code for another station.

The object of the invention is to provide a connector switch having a circuit arrangement comprising a control relay governed by a ring control device, which relay is energized over a contact of the connector switch when the wipers thereof are set in engagement with bank contacts extending to a party line for operatively connecting a ringing relay prior to the start of transmission of an impulse code series to secure transmission of the full ringing code to the called party line station.

In accordance with another object and feature of the invention, the control relay which is energized over a contact of the connector after establishing connection with the desired party line, is actuated by the ring control device to assume a switching condition so as to put the ringing relay under control of switching means which produces the ringing code allotted to the called party line station.

In accordance with a further object and feature of the invention, the relay, which places the ringing relay under control of the ring control device, is a relay adapted to operate in stages; such relay operating over the contact of the connector to assume its first stage position and thereafter assuming its second stage position under control of the ring control device, prior to the start of the next code series to effect connection of the ringing relay.

The foregoing and other objects and features will appear in the course of the description which is rendered below with reference to the accompanying drawing showing in schematic circuit representation an embodiment of a connector switch according to the invention to give an example. Only the switching means and circuits required for an understanding of the invention are illustrated in the drawing.

The connector switch shown in the drawing has access, in low-numbered decades, to individual lines and to private branch exchange trunk groups and, in high-numbered decades, to party lines.

A control contact *sk* of the connector, shown for convenience in the manner of a wiper approximately centrally of the drawing, will be in engagement with a segmental bank contact *ks*1 when a call is extended to a private branch exchange trunk group, in a low-numbered level or decade, and in engagement with a segmental contact *ks*2 when a call is extended to a party line, in a different, for example, high-numbered level or decade. Suitably interconnected individual contacts may take the place of the segmental contacts. When the wipers of the connector are set relative to a group of bank contacts extending to individual lines, in levels or decades different from those over which party lines and private branch exchange lines are reached, the control contact *sk* will not be in engagement with any segmental contact or the like.

The extension of a call to a party line station will be explained first.

Each party line station is connected with a number of bank contacts corresponding to the number of stations on the respective party line as indicated by the multiply connected bank contacts. The desired station is accordingly determined by the position of the bank contacts engaged by the wipers of the connector switch. The switching means for producing the ringing code for the station to be called, belonging to a known and suitable ring control device or interrupter, for example, a cam interrupter (not shown), are operatively connected by a ringing switch RW which is set simultaneously with the connector wipers during the station selection (units digit selection).

When the connector is idle, negative idle potential will be connected to the private conductor 1 by way of contact 2*c*, resistor 3, and contacts 4*kr*, 5*k*, 6*p*, 7*b*. When a hunting group selector switch (not shown) finds the idle connector by engagement of its private wiper with the private conductor 1, such group selector will stop.

Contacts 5*k* and 27*k* in the above traced seizure circuit and also other contacts marked *k* are vertical off-normal contacts belonging to the connector switch while contacts marked *kr* are off-normal contacts belonging to the ringing switch RW. All these contacts are in the illustrated position when the corresponding switches are at normal; as soon as these switches leave normal position, the contacts will be actuated to alternate position.

The line conductors of the preceding group selector are switched through to the line conductors 8 and 9 of the connector responsive to seizure thereof and line relay A having its windings I and II connected as shown will be energized to actuate relay C by opening of contact 12*a* and closing contact 13*a*, in circuit (1) +, C, 13*a*, resistor 14, —

Relay C opens contact 15*c* and closes contact 16*c* to prepare a circuit for a winding of relay V which however does not operate at this time, being short-circuited over closed contact 13*a*. Contact 2*c* is opened to remove negative idle potential from private conductor 1, and contact 42*c* is closed to connect positive (+) busy potential thereto.

The next impulse series transmitted from the calling station is effective to operate the vertical stepping magnet H of the connector so as to move its wipers to the decade or level containing the bank contacts of the party line to which is connected the desired called station. Relay A deenergizes responsive to each current interruption during the transmission of the corresponding impulse series (tens digit) and closes upon each deenergization a circuit for the vertical magnet H:

(2) +, 18*p*, 19*a*, 21*c*, 22*u*, 23*w*, H, —

Responsive to first deenergization of relay A, the circuit for relay V is closed:

(3) +, 12*a*, 17*g*, 16*c*, V, resistor 14, —

Relays C and V remain in known manner operated during the transmission of the impulse series. Upon termination of the impulse series, the control relay V deenergizes and the switching-over relay U is energized:

(4) +, 24*c*, GR2, 25*g*, 26*v*, winding I of U, 27*k*, 6*p*, 7*b*, —

Upon energizing, relay U actutes its contact 28*u* to bridge contact 26*v*. Contact 22*u* disconnects the vertical stepping magnet H; contact 29*u* prepares a circuit for the actuation of the rotary stepping magnet D of the connector over vertical off-normal contact 30*k*; and contact 31*u* prepares a circuit for the actuation of the rotary magnet D*rw* of the ring control switch RW. Off-normal contact 30*k* being closed, the next impulse series (units digit) will be effective to actuate the rotary stepping magnets D and D*rw*. Relay V actuates again in circuit "3" upon receipt of the first impulse of the units digit. The circuits for the rotary magnets D and D*rw* extend over the following paths:

(5) +, 18*p*, 19*a*, 21*c*, 29*u*, 30*k*, D, —

(6) +, 18*p*, 19*a*, 21*c*, 29*u*, 30*k*, 32*a*, 31*u*, D*rw*, —

Relay RR energizes over its winding I responsive to energization of relay V:

(7) +, 24*c*, GR2, 25*g*, 28*u*, 33*v*, IRR, 27*k*, 6*p*, 7*b*, —

Relay RR, among others, actuates its contact 34*rr* to close a circuit for winding I of relay G, such circuit being however ineffective because the corresponding winding I of relay G is short-circuited over contact 33*v*. The wiper 52 of the ring control switch is by the actuation of the rotary magnet D*rw* moved in engagement with a bank contact corresponding to the switching position in which the ringing code for the selected called party line station is to be transmitted. Upon conclusion of the units digit impulse series, relay V deenergizes opening its contact 33*v* and thereby completing the actuating circuit "7" for relay G over its winding IG which energizes in series with winding I of relay RR. Upon energizing, relay G opens its contact 25*g* after first closing contact 35*g*, thereby closing a holding circuit for relay G over its winding II, also a test circuit, and further an energizing circuit for relay E, the holding circuit for relay G extending over the following path:

(8) +, 24*c*, GR2, 35*g*, holding winding II of G, 44*g*, 43*b*, —

Assuming now that the seized party line is idle, there will be negative idle potential on the private conductor which is engaged by the private wiper 38 of the connector over the corresponding bank contact. Relay P energizes now over its winding I in the circuit:

(9) +, 24*c*, GR2, 35*g*, 36*u*, 37*a*, GR1, winding I of P, private wiper 38, . . ., T, —

Relay P actuates among others its contact 39*p*, thereby connecting positive potential from contact 24*c* as a busy potential directly to the private wiper 38 and at the same time operatively connecting its winding II. The line conductors are extended at contacts 40*p* and 41*p*. At contact 6*p*, the circuits extending over windings IRR, IU and IG are interrupted. Relay U is slow-to-release and maintains its armature in actuated position for some interval. Relay E energizes in the following circuit:

(10) +, 24*c*, GR2, 35*g*, 36*u*, switch contact *sk* in engagement with segmental contact *ks*2, winding I of E (IE (I)), 43*b*, —

Relay E is the previously mentioned control relay which is adapted to operate in stages and is actuated in circuit "10" by its winding I into its first stage as indicated by the bracketed index reference (I) following its letter designation E. Relay E actuates in such first stage only its contacts indexed by "I." At contact 45*e*I, relay E closes a holding circuit for its winding IE(I) which is independent of contacts *sk* and *ks*2. Contact 46*e*I is closed and contact 47*e*I is opened. The function of relay E is to secure always transmission of the full ringing code. A contact N*a* (left bottom of drawing) which may be actuated by a cam of a ringing device (not shown) is closed only when such ringing device is in a predetermined switching position, signifying that a full ringing code composed of one or more current impulses of certain length will be transmitted. The ringing device accordingly may be a known cam controlled ringing interrupter, a certain angular position of the cam (code start position) actuating the contact N*a* for actuating the relay E over its winding II to assume its second stage:

(11) +, N*a*, . . ., 46*e*I (closed in the first stage), IIE (II), GR3, 48*g*, 49*p*, 50*b*, —

Contact 51*e*II closes in the second stage of E to complete a circuit for the energization of winding II of the ringing relay RR by current from the ringing interrupter over the wiper 52 of the ring control switch RW in accordance with the ringing code to be transmitted consisting of current impulses of desired duration which may be produced by suitable cam means, the circuit being:

(12) +, ringing interrupter, wiper 52 of the ring control switch RW, 51*e*II, IIRR, GR4, 48*g*, 49*p*, 50*b*, —

Contact 53*rr* opens and contact 54*rr* closes with each energization of the ringing relay RR, thereby connecting ringing current to the line conductors over windings I and II of battery feed relay B for transmission to the seized party line station. Relay B cannot operate responsive to ringing current because its winding II is short-circuited by its own contact 55*b*.

Relay B energizes responsive to answering of the called subscriber. At contacts 56*b* and 57*b*, the line conductors are extended to the called line. At contact 55*b*, the shunt is removed from winding II of B. Contact 50*b* is opened to prevent reclosure of the circuits "11" and "12." Contact 43*b* opens the holding circuits for relays E and G extending respectively over windings IE (I) and IIG. At contact 58*b*, positive potential is connected to the private wiper 38 and winding II of relay P independent of contact 24*c*. Closure of contacts 110*b* and 111*b* and subsequent opening of contacts 10*b* and 11*b* reverses the incoming line conductors, for example, for the purpose of effecting metering of the call in known manner, connecting winding I of relay A from the line conductor 8 to line conductor 9 and switching winding IIA from line conductor 9 to line conductor 8.

The release of the connector and the ringing control switch is effected responsive to disconnect signals produced when the calling and called parties replace their handsets at the conclusion of the call.

Relay A deenergizes responsive to replacement of the handset at the calling station. At contact 12*a*, relay C will be short-circuited. Relay V energizes briefly during the interval following short-circuiting of relay C and its restoration and consequent opening of contact 16*c* without however producing any switching operation. When the called party replaces the handset, relay B will deenergize and disconnect positive potential from winding II of relay P and the private or test wiper 38 by opening its contact 58*b*. Responsive to deenergization of relays C and B, relay S will energize in a circuit:

(13) +, 59*c*, 60*wu*, 76*s*, IIS, 27*k*, 6*p*, 7*b*, —

Relay S closes its contacts 61*s* thereby closing circuits for the energization of the rotary magnets D and D*rw* as follows:

(14) +, 18*p*, 62*v*, 61*s*, *D*, —

(15) +, 18*p*, 62*v*, 61*s*, 63*kr*, D*rw*, —

Winding of relay V is now connected at contacts 64*d* and 65*drw* causing energization of V in a circuit:

(16) $+, \frac{64d}{65drw}$, 15*c*, V, resistor 14, —

Circuits "14" and "15" are interrupted at contact 62*v*. The magnets D and D*rw* restore and open circuit "16." Relay V accordingly deenergizes and recloses circuits "14" and "15." The ring control switch reaches home position first. Contact 63*kr* opens preventing reclosure of circuit "15." The wipers of the connector switch rotate beyond the last bank contacts in the corresponding level, leaving such bank contacts and circuit "13" is interrupted by opening the rotary off-normal contact 60*wu*.

Relay S restores and circuit "13" is interrupted. The wipers of the connector switch drop into the home or normal position thereby restoring to normal all contacts respectively marked *k* and 23*w*, 60*wu*. The connector switch is now ready for seizure and service in another call.

Assuming now that the connector has been seized to extend a call to a private branch exchange and has been actuated to lift its wipers relative to the level or decade containing the bank of the corresponding private branch exchange trunk group and to rotate its wipers in such level into engagement with bank contacts extending to the first trunk in such trunk group, the contacts *sk* will be in engagement with the segmental contact *ks*1. Relay S will energize over its winding I after release of relay V and consequent actuation of relay G in series with winding I of relay RR in a circuit:

(17) +, 24*c*, GR2, 35*g*, 36*u*, *sk* in engagement with *ks*1, IS, resistor 70, 27*k*, 6*p*, 7*b*, −

Relay S initiates the hunting operation of the connector for an idle one of the several trunks of the private branch exchange trunk group. The rotary magnet D energizes in the circuit "14" and closes a circuit for the energization of V:

(18) +, 64*d*, 71*g*, 16*c*, V, resistor 14, −

Relay V energizes and interrupts circuit "14" at contact 62*v*. The interplay between relay V and the rotary magnet D continues until the test or private wiper 38 finds an idle trunk of the private branch exchange trunk group or, if all such trunks are found busy, until the switch contact *sk* leaves the segmental contact *ks*1, when circuit "17" for relay S is interrupted. Contact 61*s* thereupon opens. The calling subscriber receives busy tone in known and suitable manner, not illustrated in the drawing, because it does not form part of the invention.

Relay U which maintains the busy test circuit at contact 36*u* is held operated during the hunting of the connector in a circuit:

(19) +, 24*c*, GR2, 35*g*, 72*s*, 28*u*, IU, 27*k*, 6*p*, 7*b*, −

If the connector finds an idle trunk in the private branch exchange trunk group, relay P will energize and will interrupt circuit "14" by opening contact 18*p*. Contact 49*p* is at the same time closed to establish a circuit for the ringing relay RR:

(20)

$$+, \text{IIIU}, \frac{\text{IIU}}{73}, 74u, 47e\text{I}, \text{IIRR}, \text{GR4}, 48g, 49p, 50b, -$$

The first ring is transmitted while contact 74*u* is closed. The winding IIIU opposes the windings IU and IIU, only IIU being connected at this time. The release time of relay U is adjusted by a regulable resistor 73 disposed in parallel to winding IIU. Upon deenergization of relay U, winding II of the ringing relay RR will be placed under control of a ringing interrupter RS (not shown) which connects thereto positive potential in intervals of 5 or 10 seconds. Ringing current is thus transmitted upon each energization of relay RR by way of contact 54*rr*. Answering of the called party and subsequently replacement of the handsets at the calling and called stations produces the switching operations already described.

In case the connector is seized and operated to a level or decade containing bank contacts associated with individual lines, contact *sk* will not be in engagement either with the segmental contact *ks*1 or *ks*2. The testing circuit will be completed upon energization of relay G; relay P will be energized when the desired line is found idle; and ringing current will be applied to the called line in usual manner.

Changes may be made within the scope and spirit of the appended claims.

I claim:

1. A connector switch for respectively extending telephone calls to individual lines and to private branch exchange trunk groups and to party lines, having predetermined ringing codes respectively assigned thereto, comprising a device for securing the transmission of full ringing codes to party line stations to which calls are to be extended, said device comprising a control relay adapted to be operated in two stages, control contact means actuated by said connector switch responsive to setting of the wipers thereof relative to bank contacts allotted to party line stations including a station to which a call is to be extended for initially actuating said control relay to assume its first-stage operated position, a ringing relay, code ring impulse generating means, normally open circuit means extending from said control relay to said code ring impulse generating means, contact means actuated by said control relay in its first-stage operated position for closing said normally open circuit means, further contact means in said circuit means for connecting said generating means to said control relay so as to cause actuation thereof to assume its second-stage operated position, and contact means actuated by said control relay in its second-stage operated position for connecting said ringing relay with said code ring impulse generating means at the start of transmission thereby of the code ring impulse series allotted to the called party line station to operate said ringing relay accordingly, and circuit means controlled by said ringing relay for transmitting to the called party line station ringing current in accordance with said code ring impulse series.

2. A connector switch including a device and cooperation of parts according to claim 1, wherein said control relay comprises a first and a second winding for respectively governing actuation thereof to assume said first-stage and said second-stage operating positions.

3. A connector switch including a device and cooperation of parts according to claim 2, comprising a code ring control switch having a wiper for selectively establishing connection with said code ring impulse generating means, circuit means for actuating said code ring control switch incident to the units selection operation of said connector, and contact means operated by said control relay in its second-stage operated position for connecting said ringing relay with said wiper of said code ring control switch.

4. A connector switch including a device and cooperation of parts according to claim 1, comprising a relay for initiating the hunting operation of said connector to select an idle trunk in a private branch exchange trunk group to extend a call to the corresponding private branch exchange, and circuit means including said control contact means for energizing said control relay.

References Cited in the file of this patent

UNITED STATES PATENTS

| | | |
|---|---|---|
| 2,576,216 | Dorr | Nov. 27, 1951 |
| 2,751,434 | Lomax | June 19, 1956 |
| 2,773,126 | Lomax | Dec. 4, 1956 |
| 2,788,394 | Barrow et al. | Apr. 9, 1957 |
| 2,821,574 | Sass et al. | Jan. 28, 1958 |